(12) United States Patent
Lin et al.

(10) Patent No.: US 8,204,350 B2
(45) Date of Patent: Jun. 19, 2012

(54) OPTICAL FIBER STRUCTURE WITH FILTERING THIN FILM

(75) Inventors: Shih-Ting Lin, Tainan (TW); Yao-Wun Jhang, Chiayi (TW); Hsin-Chia Su, Yunlin County (TW); Chien-Ming Huang, Chiayi (TW); Chieh Hu, Chiayi (TW)

(73) Assignee: Industrial Technology Research Institute, Hsinchu (TW)

( * ) Notice: Subject to any disclaimer, the term of this patent is extended or adjusted under 35 U.S.C. 154(b) by 169 days.

(21) Appl. No.: 12/566,677

(22) Filed: Sep. 25, 2009

(65) Prior Publication Data

US 2011/0026892 A1     Feb. 3, 2011

(30) Foreign Application Priority Data

Jul. 31, 2009   (TW) .................................. 98125929

(51) Int. Cl.
*G02B 6/10* (2006.01)
(52) U.S. Cl. ............ 385/131; 385/130; 385/52; 385/11; 385/60; 385/140; 385/49
(58) Field of Classification Search .................. 385/49, 385/51, 50, 60, 70, 72, 78, 80, 11, 130, 131, 385/52, 140
See application file for complete search history.

(56) References Cited

U.S. PATENT DOCUMENTS

| | | | |
|---|---|---|---|
| 5,208,886 A * | 5/1993 | Clayton et al. ................... 385/73 |
| 6,284,085 B1 | 9/2001 | Gwo ........................... 156/273.7 |
| 6,760,533 B2 * | 7/2004 | Nakamura et al. ............ 385/141 |
| 6,832,025 B2 | 12/2004 | Fisher et al. ..................... 385/37 |
| 7,106,980 B2 * | 9/2006 | Nakanishi et al. ............. 398/212 |
| 7,440,653 B2 | 10/2008 | Smith et al. ..................... 385/37 |
| 2002/0114565 A1* | 8/2002 | Francis ........................... 385/33 |
| 2005/0169584 A1* | 8/2005 | Takimoto et al. ............... 385/78 |
| 2011/0026892 A1* | 2/2011 | Lin et al. ....................... 385/131 |

\* cited by examiner

*Primary Examiner* — Brian Healy
(74) *Attorney, Agent, or Firm* — Jianq Chyun IP Office (57) ABSTRACT

An optical fiber with filtering thin film includes a first ferrule having a first through hole and a first contact surface. A first fiber is disposed into the first through hole, extending to the first contact surface. A first interface coupling material is between the first ferrule and the first fiber. A second ferrule has a second through hole and a second contact surface. A second fiber is disposed into the second through hole, extending to the second contact surface. A second interface coupling material is between the second ferrule and the second fiber. The first contact surface and the second contact surface are parallel and have an included tilt angle from a perpendicular transverse plane of first fiber. An optical filtering film is disposed between the first contact surface and the second contact surface. The first fiber and the second fiber are aligned.

17 Claims, 7 Drawing Sheets

OPTICAL FIBER STRUCTURE WITH FILTERING THIN FILM

CROSS-REFERENCE TO RELATED APPLICATION

This application claims the priority benefit of Taiwan application serial no 98125929, filed on Jul. 31, 2009. The entirety of the above-mentioned patent application is hereby incorporated by reference herein and made a part of specification.

BACKGROUND OF THE INVENTION

1. Field of the Invention

The present invention generally relates to an optical fiber structure, and more particularly, to an optical fiber structure with a filtering thin film.

2. Description of Related Art

The currently available optical fiber component goods, such as fiber polarizer having a reflective component with an fiber Bragg grating (FBG) for selecting wavelength or a protector for pumping light source, have disadvantage of expensive price and fabrication difficulty.

Among the related traditional technologies, for example, the one disclosed by U.S. Pat. No. 6,832,025 is based on that an optical gritting with a long cycle period is disposed between the fiber core and the fiber cladding layer of an optical fiber so as to produce a light-filtering effect with the fiber. However, the fiber engineered and fabricated with the above-mentioned approach is easily affected by thermal effect, causing wavelength drifted. In addition, the above-mentioned fiber component is disadvantageous in easily being damaged, inability of being bent and expensive price.

Among the other traditional technologies, the one, for example, disclosed by U.S. Pat. No. 7,440,653 is based on that by using interference fringes generated by laser light interference, differences of the refractive index in the fiber core are established; the differences of the refractive index further are used to form an optical gritting for selecting the wavelength of the laser light through screening. The fiber provided by U.S. Pat. No. 7,440,653 has the same disadvantage as the above-mentioned one that it is likely thermally effected to thereby make wavelength drifted, easily damaged, inability to be bent and expensive.

Confronting the above-mentioned situation, the related manufactures are making efforts to develop a simpler fabrication, which is applicable in at least the individual passive components in a fiber so as to reduce the cost.

SUMMARY OF THE INVENTION

Accordingly, the present invention is directed to an optical fiber structure with a filtering thin film. With the provided optical fiber structure, a simpler and easier fabrication and low cost are expected. In addition, with the structure for example, the polarization of the light in the fiber can be controlled, the light transmission wavelength is controllable, the different fiber segments can be directly connected to each other in adhering way so as to reduce the optical coupling loss of the light in free space and the displacement loss caused by shake, the anti-reflection layers are somewhat saved for fabricating and the fiber is capable of transmitting a higher power.

The present invention provides an optical fiber structure with a filtering thin film. The optical fiber structure includes a first fiber-solder-ferrule (FSF) having a first through hole and a first contact surface. Further, a first fiber segment is disposed into the first through hole and extends to the first contact surface, wherein there is a first interface coupling material located between the first FSF and the first fiber segment. A second FSF has a second through hole and a second contact surface. A second fiber segment is disposed into the second through hole and extends to the second contact surface, wherein there is a second interface coupling material located between the second FSF and the second fiber segment. The first contact surface and the second contact surface are parallel to each other and have a tilt angle towards a perpendicular cross-section of the first fiber segment. A filtering thin film is disposed between the first contact surface and the second contact surface, and the first fiber segment and the second fiber segment are aligned with each other.

The present invention also provides an optical fiber structure with a filtering thin film. The structure includes a FSF, a fiber and a filtering thin film. The FSF has a through hole and an end-face. The fiber segment is disposed into the through hole and extends to the end-face, wherein there is an interface coupling material located in the through hole between the FSF and the fiber. The above-mentioned filtering thin film of the optical fiber structure is disposed on the end-face, and the end-face has an angle towards a perpendicular cross-section of the FSF.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Reference will now be made in detail to the present preferred embodiments of the invention, examples of which are illustrated in the accompanying drawings. Wherever possible, the same reference numbers are used in the drawings and the description to refer to the same or like parts.

The present invention provides an optical fiber structure with a filtering thin film. The optical fiber structure has advantages of simplicity of the fabrication process flow and low relative cost. The optical fiber structure can be used, for example, to control the light polarization in a fiber and to control the light transmission wavelength as well. In addition, by directly connecting the fiber in adhering way, the present invention can further reduce the optical coupling loss of the light in free space and the displacement loss caused by shake; the anti-reflection layers are also somewhat saved for fabricating and the fiber is capable of transmitting a higher power.

Several embodiments are depicted hereinafter, which the present invention is not limited to. Moreover, the depicted embodiments can be appropriately combined with each other to form other modified embodiments.

Figure 1:
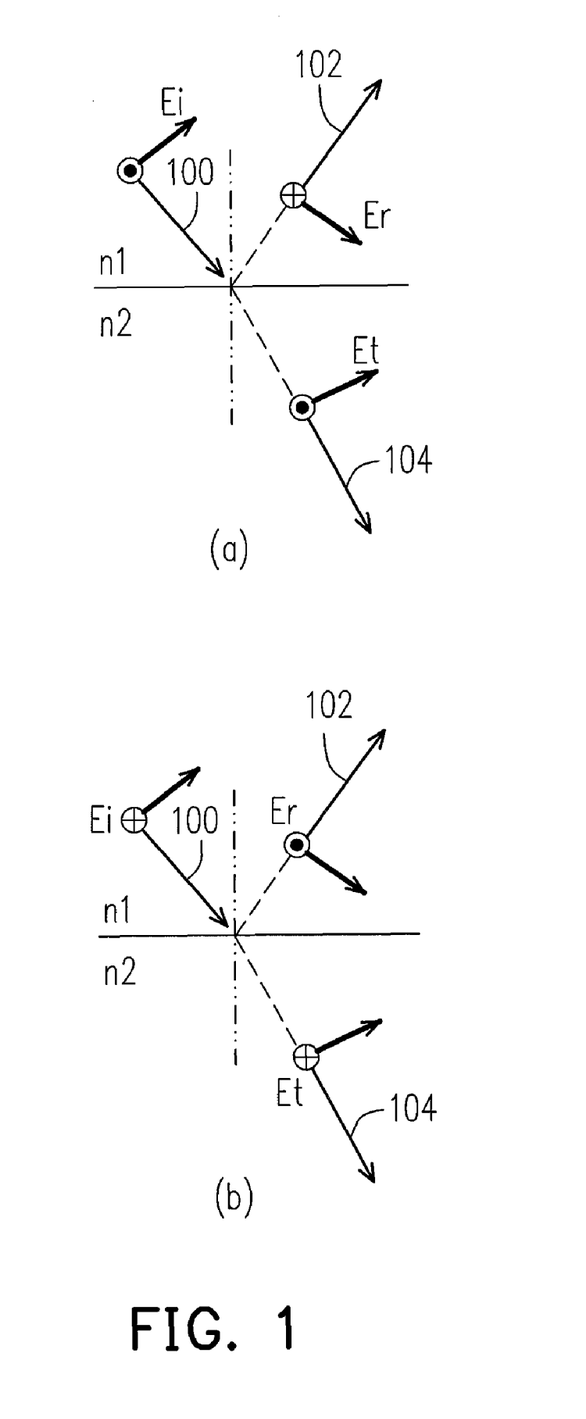
FIG. 1 is a diagram showing the polarization mechanism adopted in the present invention.

It is known that non-polarized light is formed by a plurality of polarized light blended by each other. A linear polarized light among the polarized light can be broke down into two polarization modes with polarization directions perpendicular to each other. FIG. 1 is a diagram showing the polarization mechanism adopted in the present invention. When a non-polarized light passes through a smooth interface between two media respectively with a refractive coefficient n1 and a refractive coefficient n2, due to the different polarization modes, the corresponding transmittance and reflectivity of the light are different. FIG. 1(a) is a diagram showing the changes of the polarizations of the electric field Et of transmissive light and the electric field Er of reflective light when the electric field Ei of incident light is P-polarization mode. After the incident light 100 is incident upon the interface, a part of reflective light 102 and a part of transmissive light 104 are generated, wherein the incident light 100 counts as an electromagnetic wave and contains a magnetic-field component and an electric-field component which are perpendicular to the propagation direction of the light and oscillate in the light frequency. In FIG. 1(a), the electric field Ei of incident light, the electric field Er of reflective light and the electric field Et of transmissive light at a moment are denoted with arrows, which are parallel to the 2-D coordinate plane of the diagram (i.e. the paper plane). Meanwhile, the magnetic-fields at the moment are denoted with "●" and "+", wherein "●" represents the polarization mode of the magnetic-field perpendicular to and out of the incident plane (i.e., the paper plane); "+" represents the polarization mode of the magnetic-field perpendicular to and entering the paper plane. FIG. 1(a) is corresponding to P-polarization mode and FIG. 1(b) is corresponding to S-polarization mode. Differently from FIG. 1(a), in FIG. 1(b), the electric fields Ei, Er and Et of transmissive light at a moment are denoted with "●" and "+", wherein "●" represents the polarization mode of the electric-field perpendicular to and out of the paper plane; "+" represents the polarization mode of the electric-field perpendicular to and entering the paper plane. Meanwhile, the magnetic-fields at the moment are denoted with arrows. The optical polarization is the well-known phenomena, the detail expression and deduction are omitted to describe.

Figure 2:
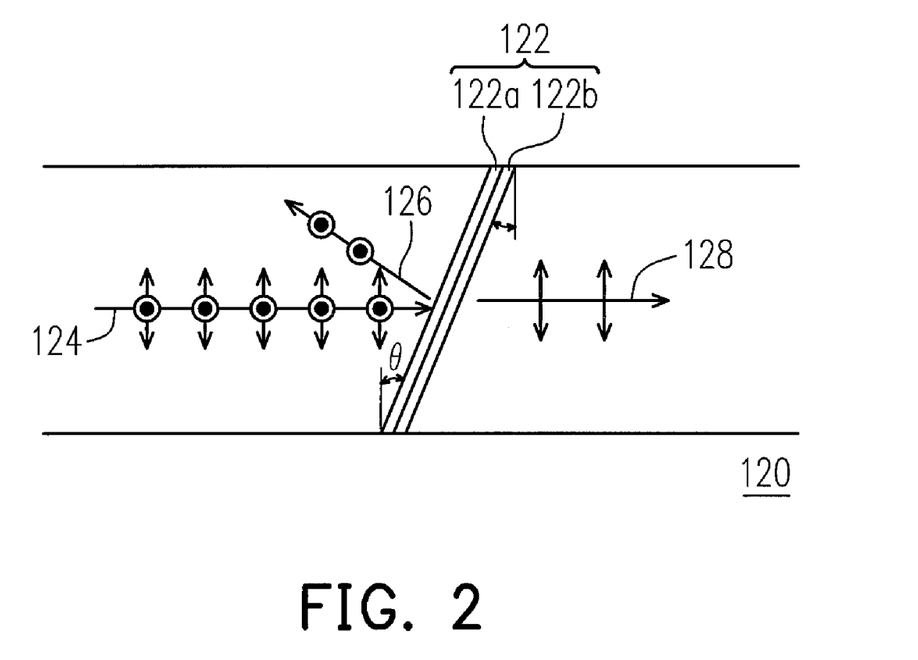
FIG. 2 is a diagram showing the working mechanism created by an optical fiber with a filtering thin film according to an embodiment of the present invention.

FIG. 2 is a diagram showing the working mechanism created by an optical fiber with a filtering thin film according to an embodiment of the present invention. Referring to FIG. 2, for suiting the application of an optical fiber in a polarization control component, a filtering thin film 122 is disposed in a fiber 120, wherein filtering thin film 122 has a tilt angle θ towards the perpendicular cross-section of the fiber. In this way, a non-polarized incident light 124 incident upon the filtering thin film 122 would generate a polarized transmissive light 128 and a polarized reflective light 126. The filtering thin film 122 includes an optical thin film 122a and an adhesion layer 122b. The adhesion layer 122b can adhere to glass for fixing, and the refractive index thereof can be easily matched for a preferred result. The adhesion layer 122b can be made of silicate. It should be noted that the depicted embodiments hereinafter are based on the exemplary adhesion layer 122b made of silicate.

In terms of the material, the adhesion layer 122b can be also made of sol-gel with the same effect as silicate. The phase of sol-gel is a colloidal suspension. Many kinds of thin films fabricated from sol-gel have high transmittance. By using colloid action, solid can be obtained from the sol-gel. The obtained solid has adhesiveness to adhere onto a desired surface. By using chemical purification and high-temperature firing process, a highly-pure oxide can be obtained from the above-mentioned solid. The gel can be doped for fabricating some special glasses. In fact, the present invention can also adopt sol-gel process to fabricate metal-oxide thin films.

In terms of mechanism, the sol-gel process can be used to fabricate ceramic and glass, wherein the process contains conversion from the liquid phase of sol into the solid phase of gel, which suits various applications: ceramics processing, glass processing and fabricating inorganic thin films. The raw material of sol is solid particles on hundreds-nanos-scale, and the solid particles are suspended and dispersed in liquid where the solid particles are usually made of inorganic metallic salt. In a typical sol-gel process, the reagent thereof is accompanied with a series of hydrolysis reactions and polycondensation reactions so as to generate colloidal suspension, wherein the substance is condenses into solvent containing solid macromolecules, i.e., gel. The major application of the sol-gel process is for fabricating thin films, in particular, optical thin films with high transmittance. The employed fabrication methods herein include spin coating, dip coating, spraying, electrophoresing, ink-jetting, roll coating on a substrate surface so as to generate the thin films. The applicable substrates are various, not limited to glass or metal. In this way, optical coatings, protective coatings and decorative coatings are generated. The sol-gel process can be also used to fabricate electro-optic materials.

The adhesion layer 122b in the filtering thin film 122 is, therefore, formed by using silicate or sol-gel. The depicted embodiment is an example, which the fabrication of the adhesion layer 122b of the present invention is not limited to. In the following, the adhesion layer 122b is, for example, formed by using silicate.

Usually, the optical thin film 122a is a multi-layers structure so as to achieve polarization and light-filtering optical effects, for example, to realize the control on polarizing light. As shown in FIG. 1, the non-polarized incident light 124 contains two polarization modes in different direction and the two modes are denoted with "●" and "double-arrows", respectively, wherein "●" represents the polarization mode perpendicular to the paper plane and "double-arrows" represents the polarization mode parallel to the paper plane. The optical thin film 122a makes the reflective light 126 become S-polarization light perpendicular to the paper plane, while the transmissive light 128 becomes P-polarization light denoted with double-arrows. The silicate adhesion layer 122b is for fixing the optical thin film 122a and the fiber 120, wherein the connection is realized by adhering, so that it has stronger joining strength. In order to make the connection effect more stable, the contact surface of the optical thin film 122a adjacent to the silicate adhesion layer 122b, i.e., the final layer of the optical thin film 122a is designed as a silicon oxide thin film to achieve preferred connection effect. When incident light 124 is transmitted in the fiber 120 and passes through the filtering thin film 122, a portion of light with unwanted polarization state is filtered out by the filtering thin film 122, and the remaining portion of the light with wanted polarization state serving as the light source is the transmissive light 128.

Figure 3:
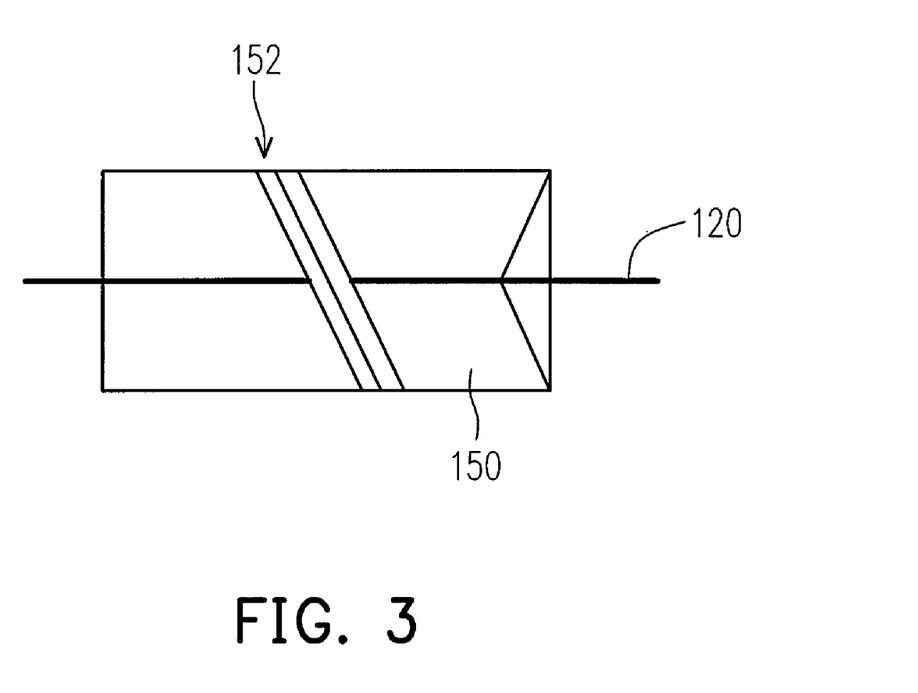
FIG. 3 is a cross-sectional diagram of an optical fiber structure with a filtering thin film according to an embodiment of the present invention.

FIG. 3 is a cross-sectional diagram of an optical fiber structure with a filtering thin film according to an embodiment of the present invention. Referring to FIG. 3, considering the cross-section area of a fiber is small, it is difficult to directly form the filtering thin film 122 as shown in FIG. 2. To over the difficulty, the present embodiment provides a novel design that two FSFs 150, for example two glass ferrules, are used to make two fiber segments 120 respectively disposed into the through holes of the two FSFs 150. The filtering thin film 152 is disposed between the two contact surfaces of the two FSFs 150, so that the filtering thin film 152 is thereby located between the two fiber segments 120 as well. The optical thin film of the filtering thin film 152 produces an optical effect as shown in FIG. 2. The silicate adhesion layers of the filtering thin film 152 are also disposed on the contact surfaces of the FSFs 150 so that an adhesion area with stronger adhesion is gained, hence the adhesion is more strong, the connection is stable, and meanwhile, all functions of the filtering thin film 152 remain. The structure provided by the embodiment is advantageous in simplicity of the process flow and thereby effectively reducing the cost. The filtering thin film 152 can have a tilt angle depending on the demand of real design. The tilt angle ranges between 0° and 80° depending on the practical demand, wherein 0° means that the optical thin film of the filtering thin film 152 is disposed along the perpendicular cross-section to the fiber.

Figure 4:
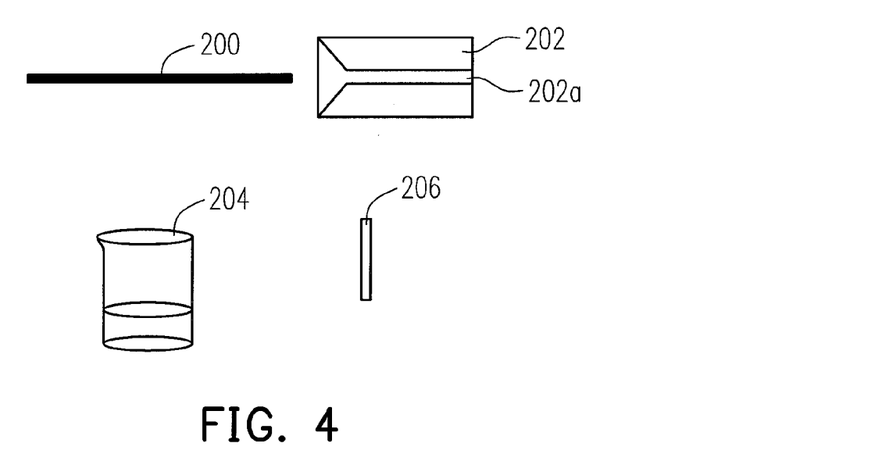
FIG. 4 is a diagram showing several parts prepared for building an optical fiber structure with a filtering thin film according to an embodiment of the present invention.

FIG. 4 is a diagram showing several parts prepared for building an optical fiber structure with a filtering thin film according to an embodiment of the present invention. Referring to FIG. 4, the parts prepared for building an optical fiber structure with a filtering thin film include a fiber 200, two FSFs 202, silicate solution 204 and an optical thin film 206. Each of the two FSFs 202 has a through hole 202a to accommodate the fiber 200. The silicate solution 204 can provide adhesion effect so that the two FSFs 202 are easily connected to each other, and the silicate solution 204 is also allowed to adhere onto the optical thin film 206. In other words, the present invention utilizes silicate material to make the FSFs and the fiber have good continuous connection surfaces to carry a stronger power. In addition, the adhesion between the thin film end-faces and the fiber can be implemented by using two glass ferrules for connection.

Figure 5A:
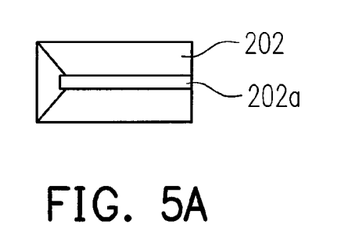
FIGS. 5A-5D are schematic flowcharts for fabricating an optical fiber structure with a filtering thin film according to an embodiment of the present invention.

FIGS. 5A-5D are schematic flowcharts for fabricating an optical fiber structure with a filtering thin film according to an embodiment of the present invention. Referring to FIG. 5A, FSFs 202 are provided, wherein each of the FSFs 202 as shown in FIG. 4 has a contact surface where the predetermined optical thin film would be formed on. Another end of the FSF 202 is, for example, a cavity structure, which facilitates guiding the fiber into the through hole 202a. The through hole 202a of the FSF 202 is filled with silicate solution 204, firstly.

Figure 5B:
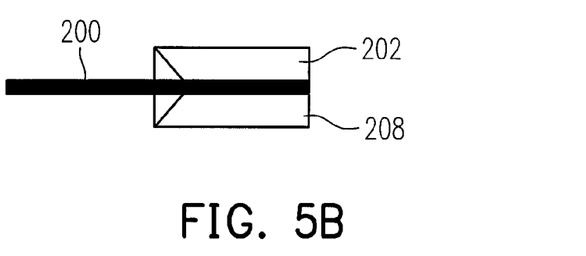

Referring to FIG. 5B, the fiber 200 then is disposed into the through hole 202a. The previously filled silicate solution 204 in the through hole 202a forms a interface coupling material between the fiber 200 and the FSF 202, while the rest pushed-out part of silicate is residual on the contact surface which further contributes eliminating the coating edge effect during the successive process of forming the optical film layer. After finishing the adhesion, the contact surface of the FSF 202 at the connection end 208 is polished.

Figure 5C:
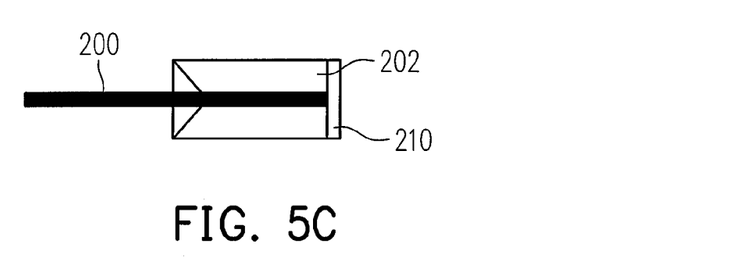

Referring to FIG. 5C, an optical film layer 210 is plated on the contact surface of the FSF 202. Usually, the optical film layer 210 is a multi-layer-films structure. Considering the adhesion effect of the silicate, the multi-layer-films structure includes, for example, silicon oxide contacting the silicate for achieving a better silicon adhesion effect. The multi-layer-films structure is, for example, a multi-layers structure comprising both $Ta_2O_5$ and $SiO_2$. The multi-layer-films structure of the present invention can be fabricated with the regular processes, and the material and the thickness thereof are determined according to the regular technique. However, it is preferred to dispose the silicon oxide layer on the outermost layer for contacting and adhering to the silicate.

Besides, during coating the contact surface of the fiber after being polished, the thickness of the first layer for contacting is preferably larger than 120 nm even larger than 500 nm, so that any defect produced due to polishing can be corrected.

Figure 5D:
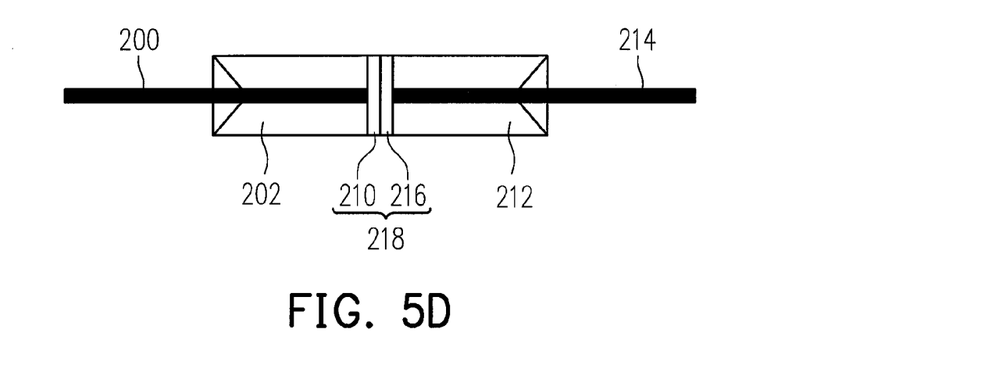

Referring to FIG. 5D, by using the same way as the mentioned above, another fiber segment 214 is disposed into another FSF 212, where there is no need to fabricate the optical film layer 210. However, depending on the practical need, another optical film layer can be plated thereon. For the simplicity of the fabrication, in the embodiment, the optical film layer is coated on the contact surface of the FSF 212. After that, two FSFs 202 and 212 are aligned with each other, and the contact surface of the FSF 212 adheres onto the optical film layer 210 by means of the silicate layer 216. After curing, the optical film layer 210 and the silicate layer 216 together constitute the filtering thin film 218, which functions for filtering light and providing the two fiber segments with connection strength.

Figure 6:
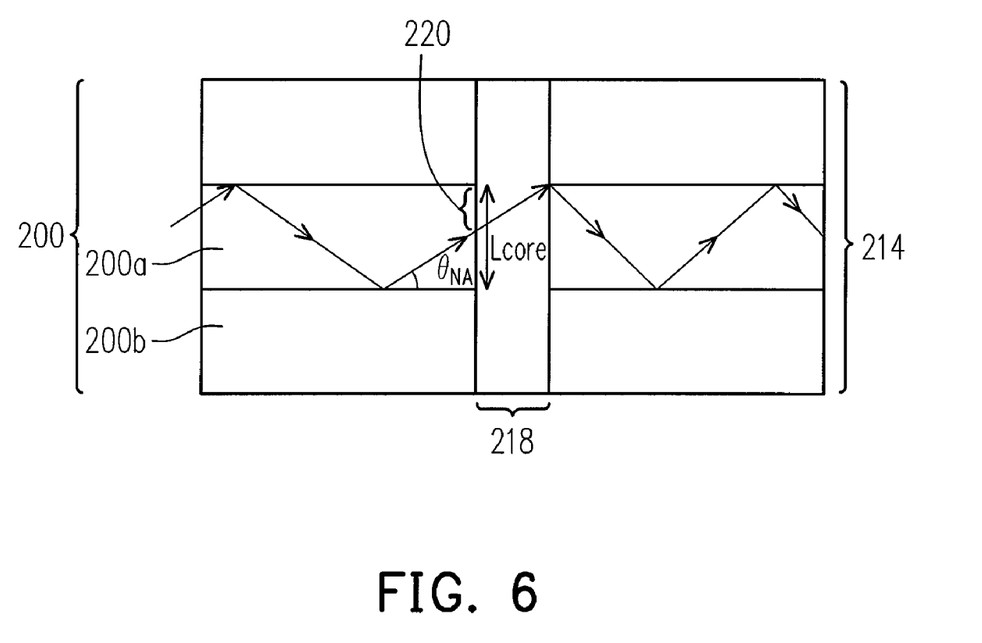
FIG. 6 is a diagram showing the effect of the thickness of the filtering thin film 218 on the light transmission in an optical fiber structure according to an embodiment of the present invention.

FIG. 6 is a diagram showing the effect of the thickness of the filtering thin film 218 on the light transmission in an optical fiber structure according to an embodiment of the present invention. Referring to FIG. 6, the optical fiber structure is based on, for example, the above-mentioned fiber 200, which basically comprises a fiber core layer 200a and a fiber cladding layer 200b. The fiber core layer 200a serves as the medium layer of light transmission, and the fiber cladding layer 200b clads the fiber core layer 200a to reach total internal reflection (TIR) effect. Therefore, only when the incident light is less than a critical angle, the incident light can be transmitted in the fiber core layer 200a. However, at the filtering thin film 218, the fiber segment 200 and the fiber segment 214 are separated by the filtering thin film 218. Moreover, the thickness of the filtering thin film 218 results in a part of light leaking, so that the light is unable to smoothly enter the fiber segment 214, where the larger the thickness of the filtering thin film 218, the more serious the light-leaking becomes. In this regard, the designed thickness must be appropriately estimated in advance. The diameter of the fiber core layer 200a is denoted with Lcore. Assuming the light-leaking occurring on a distance 220 is permitted, and the distance 220 is, for example, 5% of the diameter Lcore, then the preferred value of the thickness D of the filtering thin film 218 is estimated by Formula (1):

$$D = L_{core} * \theta_{NA} * 5\% * 3, \quad (1)$$

wherein $\theta_{NA}$ is the angle of numerical aperture (NA) and 3 is an empirical estimation value obtained by a plurality of experiments. $\theta_{NA}$ is calculated as follows:

$$NA = n_{core} \times \sin\theta_{NA}, \quad (2)$$

$$\theta_{NA} = \sin^{-1}\frac{NA}{n_{core}}. \quad (3)$$

After $\theta_{NA}$ is obtained by the above-mentioned calculation, the permitted incident angle can be defined; i.e., when the incident angle of the light is less than $\theta_{NA}$, the light can be transmitted in the fiber core layer of the fiber and enter the next fiber segment from the last fiber segment. The following embodiment is described with, for example, a fiber with NA=0.14, and the fiber is, for example, a commercial finished product with a cladding layer 200b of 105 m thickness. Usually, thickness D is, for example, equal to or less than 120 m.

Figure 7:
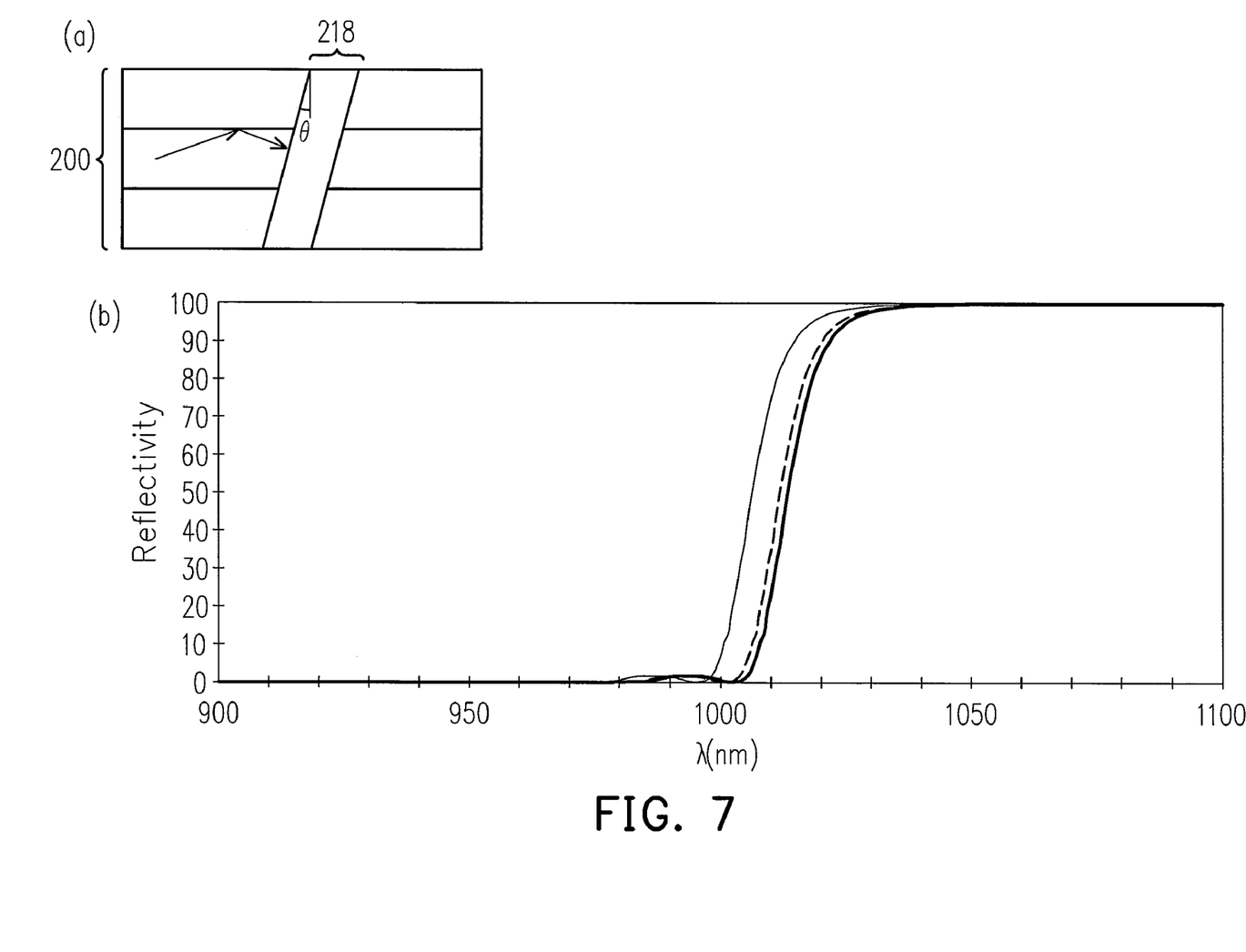
FIG. 7 is a diagram showing the design estimation of an optical fiber structure with a filtering thin film based on the reflection action created by the structure according to an embodiment of the present invention.

FIG. 7 is a diagram showing the design estimation of an optical fiber structure with a filtering thin film based on the reflection action created by the structure according to an embodiment of the present invention. Referring to FIG. 7(a), the tilt angle θ of the filtering thin film 218 ranges, for example, between 0° and 8°. The angle of the incident light is designed, for example, between 0° and $\theta_{NA}$, wherein angle of the incident light means the included angle towards the surface of the fiber core.

Referring to FIG. 7(b), it is a diagram showing the distribution of reflectivity vs. wavelength corresponding to different incident angles. The optical thin film in the filtering thin film 218 comprises, for example, $Ta_2O_5$ and $SiO_2$ so as to achieve the equivalent physical thickness, for example, 544 nm. The fine line in FIG. 7(b) represents incident angle of 0°, the bold line represents incident angle of 8° and the doted line represents incident angle between 0° and 8°. Therefore, in terms of a laser light with a regular wavelength of, for example, 1064 nm, the tilt angle θ is designed about between 0° and 8°. With the tilt angle θ, the incident light can be substantially reflected by the filtering thin film 218 back to the fiber 200 for utilization. It should be noted that the above-mentioned range of the tilt angle θ is the operation range defined by the practical design, which the present invention is not limited to.

Figure 8:
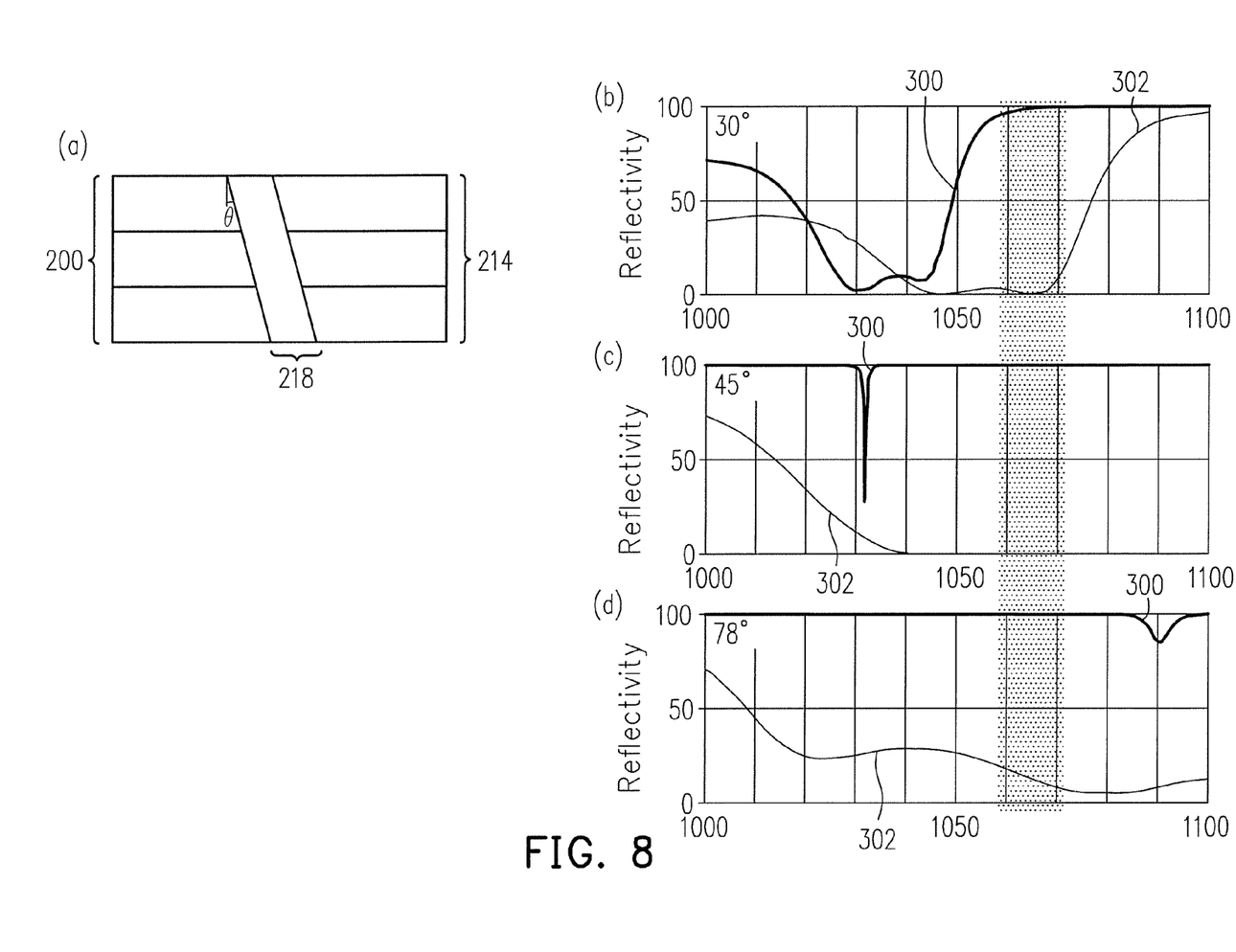
FIG. 8 is a diagram showing the design estimation of an optical fiber structure with a filtering thin film based on the polarization action created by the structure according to an embodiment of the present invention.

FIG. 8 is a diagram showing the design estimation of an optical fiber structure with a filtering thin film based on the polarization action created by the structure according to an embodiment of the present invention. Referring to FIG. 8(a), the tilt angle θ of the filtering thin film 218 has the same definition as mentioned above, but the design range of the tilt angle θ is about between 30° and 78° and the range of the angle of the incident light is between 0° and $\theta_{NA}$ so as to produce the polarization effect. FIG. 8(b) is a reflectivity simulation diagram corresponding to the tilt angle θ of 30°, wherein the bold line 300 represents the reflectivity distribution of light with S-polarization mode along with the wavelength variation and the fine line 302 represents the reflectivity distribution of light with P-polarization mode along with the wavelength variation. FIG. 8(c) is a reflectivity simulation diagram corresponding to the tilt angle θ of 45°, wherein, the same as mentioned above, the bold line 300 represents the reflectivity distribution of light with S-polarization mode along with the wavelength variation and the fine line 302 represents the reflectivity distribution of light with P-polarization mode along with the wavelength variation. FIG. 8(d) is a reflectivity simulation diagram corresponding to the tilt angle θ of 78°, wherein, the same as mentioned above, the bold line 300 represents the reflectivity distribution of light with S-polarization mode along with the wavelength variation and the fine line 302 represents the reflectivity distribution of light with P-polarization mode along with the wavelength variation. Corresponding to the operation waveband within the hatched area, the polarization state can be substantially separated, so as to achieve the polarization effect.

Figure 9:
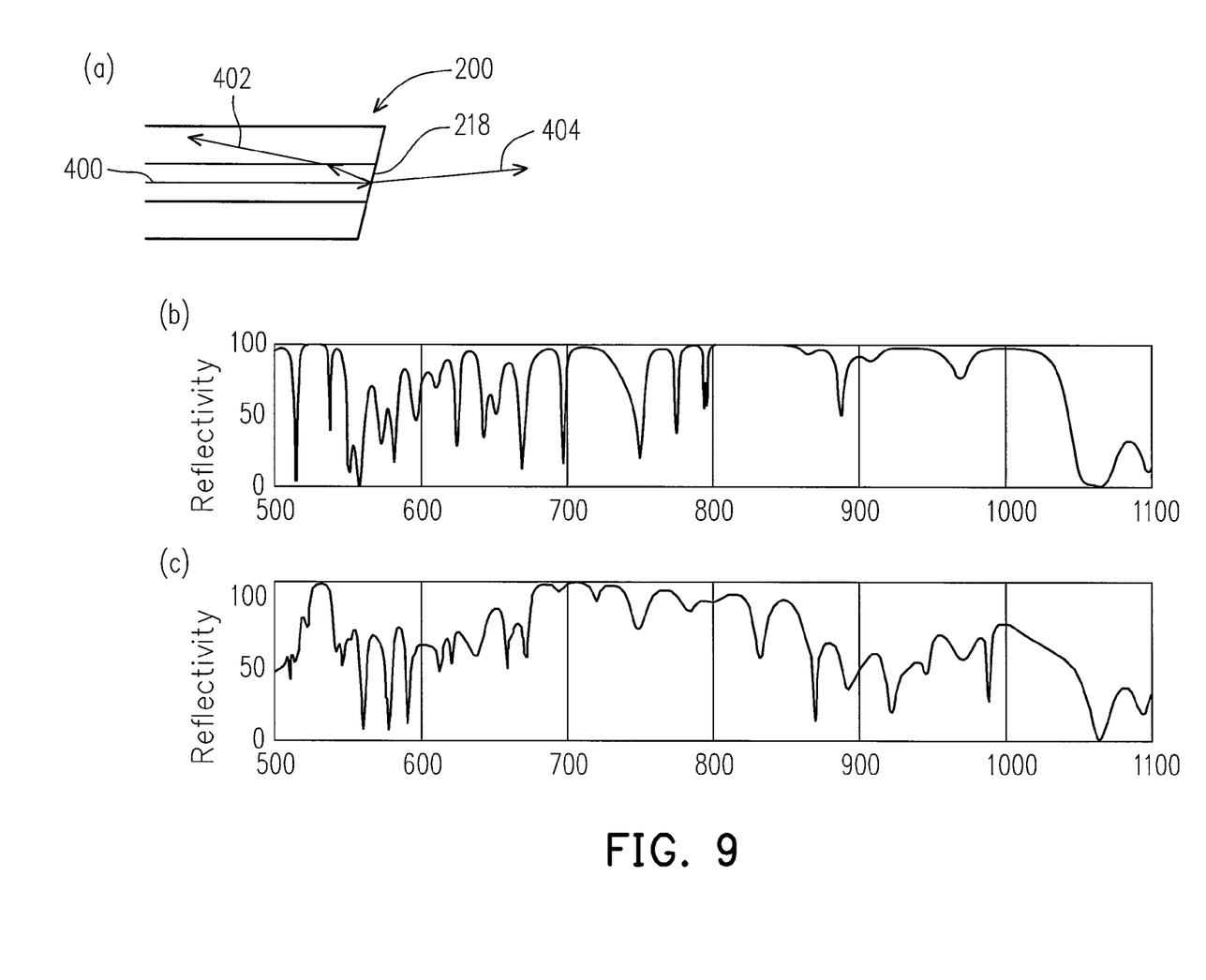
FIG. 9 is a diagram showing the design estimation of an optical fiber structure with a filtering thin film based on the light-filtering action created by the structure according to an embodiment of the present invention.

FIG. 9 is a diagram showing the design estimation of an optical fiber structure with a filtering thin film based on the light-filtering action created by the structure according to an embodiment of the present invention. Referring to FIG. 9(a), the optical fiber structure herein is the same as the mentioned above, but the design range of the tilt angle θ is about between 8° and 70° and the range of the angle of the incident light is between 0° and $\theta_{NA}$ so as to produce the light-filtering effect. The light-filtering effect herein means, for example, a non-polarized incident light 400 produces a reflective light 402 and a transmissive light 404 at the filtering thin film 218. FIG. 9(b) is a reflectivity simulation diagram corresponding to the tilt angle θ of 8°. FIG. 9(c) is a reflectivity simulation diagram corresponding to the tilt angle θ of 70°. Referring to FIGS. 9(b) and 9(c), a light with a waveband near, for example, 532 nm is substantially reflected; however, the light with other wavebands can be transmitted so as to achieve the light-filtering effect. For another example, in order to obtain a light with wavelength of 1064 nm or so, the reflectivity thereof is substantially zero, while the wavelength of the transmissive light is 1064 nm or so. Therefore, with the range of incident angle between 8° and 70°, the light-filtering effect can be achieved.

Since the above-mentioned three operation ranges of tilt angle θ have overlapped area by each other so that an overlapped effect is thereby produced, which, for example, can achieve both light-filtering effect and polarization effect. However, the operation range of the present invention is not limited to the above-mentioned embodiments. In fact, the operation range can be designed according to the real material, the wavelength to be operated and the wished optical effect.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An optical fiber structure with a filtering thin film, comprising:
    a first fiber-solder-ferrule, having a first through hole and a first contact surface;
    a first fiber segment, disposed into the first through hole and extending to the first contact surface, wherein a first interface coupling material is located in the first through hole between the first fiber-solder-ferrule and the first fiber segment;
    a second fiber-solder-ferrule, having a second through hole and a second contact surface;
    a second fiber segment, disposed into the second through hole and extending to the second contact surface, wherein a second interface coupling material is located in the second through hole between the second fiber-solder-ferrule and the second fiber segment, wherein the first contact surface and the second contact surface are parallel to each other and have a tilt angle towards a perpendicular cross-section of the first fiber segment; and a filtering thin film, disposed between the first contact surface and the second contact surface, wherein the first fiber segment and the second fiber segment are aligned with each other, wherein the first contact surface and the second contact surface are respectively a lapped surface.

2. The optical fiber structure with a filtering thin film as claimed in claim 1, wherein the materials of the first interface coupling material and the second interface coupling material are silicate or sol-gel.

3. The optical fiber structure with a filtering thin film as claimed in claim 1, wherein the filtering thin film comprises:
an optical thin film, plated on the first contact surface; and
an adhesion layer, disposed on the second contact surface and adhering to the filtering thin film.

4. The optical fiber structure with a filtering thin film as claimed in claim 3, wherein a total thickness of the filtering thin film and the adhesion layer has an upper limit value:

$$L_{core} * \theta_{NA} * 5\% * 3,$$

wherein $L_{core}$ represents the diameter of a core fiber of the first fiber segment and $\theta_{NA}$ represents an angle of numerical aperture of the core fiber relative to a cladding fiber of the first fiber segment.

5. The optical fiber structure with a filtering thin film as claimed in claim 1, wherein the filtering thin film comprises a silicon oxide film layer and an adhesion layer in contact, and the adhesion layer is for coupling the first fiber-solder-ferrule with the second fiber-solder-ferrule.

6. The optical fiber structure with a filtering thin film as claimed in claim 5, wherein the material of the adhesion layer is silicate or sol-gel.

7. The optical fiber structure with a filtering thin film as claimed in claim 1, wherein an incident angle of the first fiber segment is not greater than $\theta_{NA}$, wherein $\theta_{NA}$ is an angle of numerical aperture of a core fiber of the first fiber segment relative to a cladding fiber.

8. The optical fiber structure with a filtering thin film as claimed in claim 1, wherein the tilt angle of the first contact surface is to make the light incident from the first fiber segment substantially reflected.

9. The optical fiber structure with a filtering thin film as claimed in claim 8, wherein the tilt angle of the first contact surface is about 0°-8°.

10. The optical fiber structure with a filtering thin film as claimed in claim 1, wherein the tilt angle of the first contact surface is to make the light incident from the first fiber segment go through the second fiber segment and polarized.

11. The optical fiber structure with a filtering thin film as claimed in claim 10, wherein the tilt angle of the first contact surface is about 30°-78°.

12. The optical fiber structure with a filtering thin film as claimed in claim 1, wherein the tilt angle of the first contact surface is to make the light incident from the first fiber segment substantially allowed to partially go through the first contact surface and enter the second fiber segment, wherein the going through light occupies only a waveband of the incident light.

13. The optical fiber structure with a filtering thin film as claimed in claim 12, wherein the tilt angle of the first contact surface is about 8°-70°.

14. The optical fiber structure with a filtering thin film as claimed in claim 1, wherein the filtering thin film comprises at least an optical thin film contacting the first contact surface, and the thickness of the optical thin film is about less than 120 nm.

15. The optical fiber structure with a filtering thin film as claimed in claim 1, wherein the filtering thin film comprises:
a plurality of layers of optical thin films having a front optical thin film contacting the first contact surface and a rear optical thin film; and
an adhesion layer, located between the rear optical thin film and the second contact surface and functioning to make the first fiber-solder-ferrule and the second fiber-solder-ferrule fixed by each other.

16. The optical fiber structure with a filtering thin film as claimed in claim 15, wherein the material of the adhesion layer is silicate or sol-gel.

17. The optical fiber structure with a filtering thin film as claimed in claim 15, wherein the thickness of the optical thin film is about greater than 120 nm.

* * * * *